April 22, 1924.
M. C. L. BOCHET
1,491,376
INTERNAL COMBUSTION ENGINE
Filed May 3, 1922
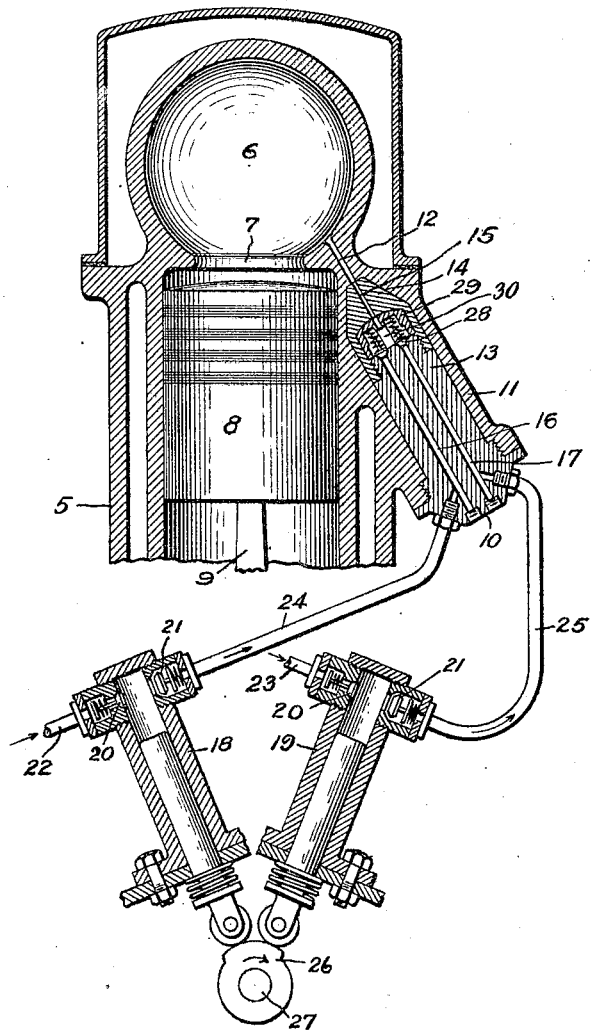
Inventor:
Marcel C.L. Bochet,
by Albert G. Davis
His Attorney Patented Apr. 22, 1924.

1,491,376

UNITED STATES PATENT OFFICE.

MARCEL CHARLES LOUIS BOCHET, OF PARIS, FRANCE, ASSIGNOR TO GENERAL ELECTRIC COMPANY, A CORPORATION OF NEW YORK.

INTERNAL-COMBUSTION ENGINE.

Application filed May 3, 1922. Serial No. 558,081.

*To all whom it may concern:*

Be it known that I, MARCEL CHARLES LOUIS BOCHET, a citizen of the French Republic, residing at Paris, France, have invented certain new and useful Improvements in Internal-Combustion Engines, of which the following is a specification.

The present invention relates to internal combustion engines of the type in which fuel is injected in liquid form directly into the combustion space of the engine cylinder, for example into an ignition chamber communicating with the cylinder. The invention is particularly well adapted to engines provided with an ignition chamber, and in the accompanying drawing I have shown it applied to this type of engine but it will be understood that the invention is not necessarily limited thereto.

The object of the invention is to provide an improved method of and means for injecting a liquid fuel charge into an engine of the above type whereby all the fuel is made to enter the combustion space and be thoroughly atomized.

For a consideration of what I believe to be novel and my invention, attention is directed to the accompanying description and the claims appended thereto.

In the drawing, the figure is a sectional view of a diagrammatic nature illustrating my invention.

Referring to the drawing, 5 indicates the cylinder of an internal combustion engine, having a combustion space 6 forming one end of the cylinder and slightly separated from the portion in which the piston operates by a contraction of the cylinder wall as indicated at 7. This portion of the cylinder is usually termed an ignition chamber. The piston is shown at 8 and it is connected by a connecting rod 9 to the usual crank shaft, (not shown). Fuel is supplied to the ignition chamber by a fuel injector 10 mounted in a suitable holder 11, the fuel entering the ignition chamber through a passage 12. The fuel injector comprises a body portion 13 to which is fastened a spray nozzle 14 having a passage 15 which communicates with passage 12.

Now according to my invention, I provide the body of the fuel injector with two passages 16 and 17, both of which communicate at one end with passage 15. The other ends of passages 16 and 17 are connected to suitable pumps 18 and 19, one of which pumps fuel to the engine cylinder and the other water. The arrangement is such that first the fuel pump is actuated to inject a charge of fuel into the ignition chamber after which the water pump is actuated to pump a charge of water to the ignition chamber, both charges entering through the same passage 12. By this arrangement the charge of water serves to drive the last remaining portion of fuel from the injector into the ignition chamber thus insuring complete combustion of even the smallest quantity of fuel and preventing the formation of drops of liquid fuel which are insufficiently divided to burn efficiently. Furthermore the water serves to cool the injector and keep it clean and at the same time improve the action of the engine, it being well recognized that a certain amount of water is favorable to the action of an engine of this general type.

In the present instance 18 is the fuel pump and 19 the water pump. They are provided with suction valves 20 and discharge valves 21 and are connected on the one hand to suitable supplies of fuel and water respectively by pipes 22 and 23 and to the fuel injector by pipes 24 and 25. Their plungers are actuated by a cam means 26 which may be operated from the crank shaft of the engine either directly in connection with two-stroke cycle engines or by means of a cam shaft 27 driven by the crank shaft in connection with four-stroke cycle engines. Preferably the arrangement is such that the water pump begins its discharge stroke a short time before the discharge stroke of the fuel pump is completed so that the last drops of fuel oil delivered by the fuel pump are driven violently by the pumped water following them and are atomized completely and without the possibility of the formation of any large drops of fuel oil. Also the injected water is atomized and serves to cool the injector and the ignition chamber. In the present instance the pump plungers are shown as being both operated by the same cam, the pumps being angularly displaced so that the fuel pump is operated prior to the water pump. It will be understood, however, that this is only by way of example and that any suitable arrangements may be used. It will be understood, also, that the pumps may be controlled by a suitable governor to regulate the engine as is well known in connection with the operation of such engines.

At the inner ends of passages 16 and 17 are spring pressed check valves 28 carried by a cage 29 which guides the valves and also provides a common chamber 30 through which passages 16 and 17 communicate with passage 15.

I have shown my invention applied to a single cylinder engine but it may be applied to any engine either single cylinder or multi-cylinder.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is—

1. The method of supplying a liquid fuel charge to a combustion chamber comprising forcing said fuel charge through an injector into said chamber and then clearing the injector of the residue of the charge with a second fluid under pressure.

2. The method of supplying a charge of liquid fuel to a combustion chamber comprising applying a pressure directly to the fuel charge, passing it through an injector to the combustion chamber, and then applying a supplementary pressure indirectly to the fuel charge through the medium of a second fluid supplied under pressure at the injector to scavenge the same and to atomize and carry into the combustion chamber the residue of the fuel charge.

3. The combination with an engine cylinder having an ignition chamber, of means for supplying a charge of liquid fuel to said chamber comprising a pump supplying the fuel under pressure, an atomizing injector through which the fuel is passed to the chamber, a second pump supplying a fluid under pressure behind the fuel charge to scavenge the injector and atomize the residue of the fuel charge, and means for causing the second pump to operate in sequence with the first.

4. The combination with an engine cylinder having an ignition chamber, of a fuel atomizing injector through which a liquid fuel is supplied to said chamber, means for supplying liquid fuel to the injector, and means for supplying a scavenging fluid to the injector timed to enter substantially behind the fuel charge to hasten the passage of the same therethrough and to scavenge the injector preparatory to receiving a following charge of fuel.

5. The combination with an engine cylinder having an ignition chamber, of means for atomizing a fluid fuel therein comprising an injector providing a passage through which the ignition chamber is supplied, a pump supplying a fuel charge under pressure to the injector passage, said pressure carrying a major portion of the fuel charge into the ignition chamber, and a second pump supplying water under pressure to the injector passage in sequence with the first named pump whereby the water enters the injector behind the major portion of the fuel charge carrying the remainder of said charge into the ignition chamber and scavenging the injector.

6. The combination with an engine cylinder having an ignition chamber, of a fuel pump, an injector opening into the ignition chamber and connected with said pump, means for actuating said pump to inject a fuel charge into said chamber, a water pump connected with the injector, and means for actuating the last named pump in sequence with the first named pump to inject a water charge into said chamber through the injector after a major portion of the fuel charge has passed whereby the residue of the fuel charge will be cleared from the injector and atomized by the water charge behind it and the injector scavenged thereby.

In witness whereof, I have hereunto set my hand this 10th day of April, 1922.

MARCEL CHARLES LOUIS BOCHET.